United States Patent Office
3,582,293
Patented June 1, 1971

3,582,293
PREPARATION OF THIOPHOSPHORYL HALIDES
Joseph D. Odenweller, Bloomfield Hills, Mich., assignor to Ethyl Corporation, New York, N.Y.
No Drawing. Filed Sept. 8, 1967, Ser. No. 666,508
Int. Cl. C01b 25/10
U.S. Cl. 23—368
16 Claims

ABSTRACT OF THE DISCLOSURE

Alkylphosphonothioic dichloride-aluminum trihalide complexes, which can be produced by reacting thiophosphoryl halide with an alkyl aluminum sesquihalide or trialkyl aluminum, catalyze the formation of thiophosphoryl halide from sulfur and phosphorus trihalide.

BACKGROUND OF THE INVENTION

It is known in the art that a thiophosphoryl halide can be produced by reacting phosphorus trichloride and sulfur according to the following equation:

(1) $\quad PCl_3 + S \rightarrow PSCl_3$

Prior workers have also discovered that this process can be catalyzed by various substances. In this regard, reference is made to U.S. Pats. Nos. 2,715,561, 2,802,717, 2,850,353, 2,850,354, 2,911,281, and 2,915,361. The Cook patent, U.S. 2,591,782, teaches that aluminum trihalides are suitable catalysts.

German Pat. No. 1,235,911 teaches that alkylphosphonothioic dichlorides can be prepared in low yield by reacting thiophosphoryl trihalides with trialkyl aluminums. Alkylphosphonothioic dichlorides are useful as chemical intermediates. One method for their use is disclosed in U.S. 3,024,278.

The U.S. patent mentioned last above and the German patent, supra, demonstrate that thiophosphoryl halides are useful materials. A need exists for an economical preparation of these compounds, and this invention satisfies that need. More particularly, this invention satisfies two main objects:

the economical utilization of aluminum values in the synthesis of thiophosphoryl halides, and
provision of a catalytic system especially suited to a reaction sequence for the preparation of alkylthiophosphoryl dihalides through a thiophosphoryl halide intermediate.

SUMMARY OF THE INVENTION

The essence of this invention is the discovery that complexes of aluminum halides and alkylphosphonothioic dihalides catalyze the formation of thiophosphoryl trihalides from sulfur and phosphorus trihalides. The catalytic complex need not be pure. Rather, it is advantageous to use the complex in the reaction mixture produced by reacting a thiophosphoryl trihalide with an alkyl aluminum sesquihalide or trialkyl aluminum.

DESCRIPTION OF PREFERRED EMBODIMENTS

A preferred embodiment comprises a process for the preparation of a thiophosphoryl halide, said process comprising reacting sulfur and a phosphorus trihalide at a temperature of from about 20° to about 120° C., said process being catalyzed by a catalytic quantity of a catalytic complex having the formula $RPSX_2 \cdot AlX_3$ wherein R is an alkyl group having up to six carbon atoms, and X is a halogen of atomic number 17 to 35.

Although all the catalysts having the formula $RPSX_2 \cdot AlX_3$ as defined above can be used in the process of this invention, certain compounds are preferred. Compounds wherein all halogens are the same comprise the first class of preferred catalysts. Second, chlorides are more highly preferred. Of these the methyl and ethyl compounds are most preferred. In other words, the most preferred catalysts are $CH_3PSCl_2 \cdot AlCl_3$ and $C_2H_5PSCl_2 \cdot AlCl_3$.

As illustrated by the examples below, the catalysts of this invention are preparable by two processes illustrated by the following equations:

(2) $\quad 3PSX_2 + R_3Al_2X_3 \rightarrow RPSX_2 + 2RPSX_2 \cdot AlCl_3$ (3) $\quad 3PSX_3 + AlR_3 \rightarrow 2RPSX_2 + RPSX_2 \cdot AlCl_3$ The processes of Equations 2 and 3 are both conducted by simply mixing the reactants. To achieve desirable yields in reasonable reaction times, both processes are carried out at temperatures within the range of from about 50° C. to about 130° C. The trialkyl aluminums are preferably reacted at temperatures from about 65° to about 80° C. On the other hand, the sesquihalides are preferably reacted at temperatures from about 70° to about 85° C.

Reaction pressure is not critical; the reaction proceeds well at ambient pressure. Greater or lesser pressures (for example, 0.25 to 3000 atm.) can be used, if desired. Usually reaction times of up to 18 hours are sufficient. In many instances, the reactions are complete in less than eight hours, e.g. one to six hours. Usually best results are achieved when 1.0 to about 1.2 theories of aluminum compound are employed per each mole of $PSX_3$. One "theory" is the amount of aluminum alkyl or aluminum sesquihalide (on a molar basis) required to react with one mole of thiophosphoryl halide to form a monoalkylated product according to Equations 2 or 3.

To achieve highest yields of the catalytic complexes, the reaction is carried out by reacting the thiophosphoryl halide and the aluminum sesquihalide (or aluminum alkyl) without adding any common hydrocarbon solvent to the reaction zone. Any minor amount of hydrocarbon solvent present as an impurity in the starting materials is not overly deleterious. In other words, it is not necessary to carefully purify the starting materials to remove any traces of hydrocarbon solvent. Thus, it is possible to use readily available forms of the reactants.

The exact nature of these catalytic complexes is not known. Presumably, the aluminum trihalide moiety is coordinated—through the aluminum atom—to the sulfur atom in the phosphonothioic dichloride moiety. Complexes between aluminum chloride and alkylphosphonothioic dichlorides—wherein the alkyl radical has up to six carbon atoms—have limited solubility in refined mineral oil. In fact, the complex $CH_3PSCl_2 \cdot AlCl_3$ is appreciably insoluble therein. It is a liquid at ambient temperature.

The complexes can be broken by pouring over ice. Alternatively, they can be disrupted by treatment with dioxane or an alkali metal halide such as sodium chloride. Such treatment is illustrated by the following equation:

(4) $\quad RPSX_2 \cdot AlX_3 + NaX \rightarrow RPSX_2 + NaAlX_4$

When the process of this invention is used in a reaction sequence directed ultimately to the preparation of alkylphosphonothioic dichlorides, it is advantageous to reserve a minor amount (say 10 percent) of the reaction product produced by Equation 2 or 3 to catalyze a subsequent preparation of $PSX_3$ and to treat the major portion of the reaction product according to the process of Equation 4 to obtain the desired end product.

When conducting the process of this invention, the relative amounts of sulfur and phosphorus trihalide are not critical. For economic considerations, it is usually desirable to employ an approximately stoichiometric quantity of reactants. However, it is not necessary to do so. Thus, it is possible to use a 20 mole percent or greater excess of either reactant. If an excess of reactant is desired, it is usually more economical to use the cheaper reactant, sulfur.

A catalytic quantity of complex is employed. Generally, an amount of catalyst within the range of from 0.05 to 0.5 mole of catalyst per mole of phosphorus trihalide is a suitable quantity. However, greater or lesser amounts can be employed if desired. Generally, from 0.075 to 0.3 mole of catalyst per mole of phosphorus trihalide yields satisfactory results.

In many instances, the reaction is exothermic and cooling means are sometimes required to maintain the reaction temperature at the desired level. The rate of mixing the reactants and catalyst can be used to control the temperature.

It is preferred to add the sulfur (or the phosphorus trihalide) to the other two ingredients.

The reaction time is not a truly independent variable and is dependent at least to some extent by the other process conditions used and the inherent reactivity of the reaction ingredients. In general, the reaction is complete in less than 10 hours; 5 hours or less being sufficient in many instances.

The following non-limiting examples illustrate the process of this invention. All parts are by weight. Example I demonstrates in some detail how the process of this invention can be embodied in a preparation of an alkyl phosphonothioic dihalide to accomplish re-use of aluminum values.

EXAMPLE I (1) Nitrogen flush a suitable reaction vessel and maintain a nitrogen atmosphere throughout the run. The vessel should be dry.

(2) Prepare a 10 percent $PSCl_3$ preliminary mixture as follows:

(a) Charge 4.54 parts $PCl_3$ and 0.43 part $AlCl_3$ to the vessel.
(b) With stirring, heat to 60–65° C.
(c) Add 1.1 part sulfur incrementally at a rate to maintain the temperature between 60 and 70° C. After adding the initial increment, be sure the reaction has initiated (indicated by an exothermic reaction) before adding additional increments.

(3) Charge 9.6 parts sulfur to a kettle connected to the reaction vessel by a transfer line. Under $N_2$ atmosphere, heat the second vessel to 140° C. to the melted sulfur.

(4) Add 3.9 parts $AlCl_3$ to the reaction vessel.

(5) Heat the transfer line to 140° C. and the reaction vessel to 105° C.

(6) Transfer the molten sulfur to the hot (105°) "heel."

(7) Form the rest of the $PSCl_3$ to be used in this first stage by adding 40.86 parts $PCl_3$ to the "heel"-sulfur charge. Allow the reaction temperature to fall gradually to 65° C. as $PSCl_3$ is formed. Attain 65° C. when about half the $PCl_3$ is in and maintain the temperature at 65–75° C. for remainder of feed. The reaction is exothermic.

(8) Add 28.9 parts of ethyl aluminum sesquichloride to the charge at a rate to maintain the temperature between 70 and 85° C. This is also an exothermic reaction.

(9) Remove 8.9 parts (10 percent) of the reaction mass which now contains ethyl phosphonothioic dichloride and the catalytic complex of that substance with aluminum chloride (see Equation 2 above). This will be used as a "heel" to catalyze the next sulfurization reaction. Store the "heel" under nitrogen atmosphere.

(10) Add 14.2 parts NaCl to the remainder of the charge. This amounts to one mole of NaCl per mole of $AlCl_3$.

(11) Reduce pressure to 50 mm. Hg and distill the product $C_2H_5PSCl_2$ to a pot temperature of 130° C.

(12) Store the product in glass containers.

(13) Stop agitation and bring the system back to atmospheric pressure with nitrogen. The molten salt complex $NaAlCl_4$ will settle to the bottom.

(14) While hot (130° C.) the residue can be drained from the reaction vessel. The discharge lines should be heated to 130° C. to keep the salt from freezing.

(15) Repeat Steps 3 and 5–14 using the "heel" formed Step (9) to prepare another batch of $C_2H_5PSCl_2$.

EXAMPLE II

Repetition of Example I with the exception that the ethyl aluminum sesquichloride is substituted with a molar equivalent of triethyl aluminum also yields the same product, ethylphosphonothioic dichloride. Similar results are obtained when the formation of $PSCl_3$ from $PCl_3$ and sulfur is catalyzed by the heel at 55°, 70° and 80° C. Likewise, similar results are obtained when the catalysis with $AlCl_3$ is conducted at 55°, 75° and 80° C.

EXAMPLE III

A 500 ml. flask was flushed with nitrogen and charged with 68.8 grams of $PCl_3$ and 6.5 g. $AlCl_3$. The contents were stirred and heated to 50° C. After reaching this temperature, 16.2 grams of sulfur was added incrementally over a 15 minute period while maintaining the temperature at 50–66° C. After all sulfur had been added, 34.2 grams of methyl aluminum sesquichloride was added dropwise over a 19 minute period. The reaction temperature rose rapidly to 100° C. after addition of the sesquihalide was initiated. The temperature was allowed to fall to 40° C. (after all sesquihalide had been added). A 5 ml. sample of product which contained both $CH_3PSCl_2$ and $CH_3PSCl \cdot AlCl_3$ was removed for catalysis of the second preparation discussed in the paragraph immediately below. The remaining reaction mass was worked up by adding 23.4 g. of NaCl and distilling the product at 163° and 43 mm. The yield was 83.9 percent of a product analyzing 97 percent $CH_3PSCl_2$ and 2.2 percent $PSCl_3$ The 5 ml. "heel" pulled was about equivalent to a 5 percent yield of $CH_3PSCl_2$.

Another run was made in the same manner as above except that the 5 ml. "heel" was substituted for the 6.5 g. of $AlCl_3$. A product, 79.9 grams, analyzing 97 percent $CH_3PSCl_2$ and 2.2 percent $PSCl_3$ was obtained. Allowing 5 percent yield due to the "heel" the conversion of $PSCl_3$ to $CH_3PSCl_2$ calculates to be 99 percent.

Similar results are obtained when the reaction of $PCl_3$ and sulfur catalyzed by the "heel" is conducted at 60° and 80° C.

When conducting these processes wherein the reaction "heel" is reserved for catalysis of a subsequent preparation of thiophosphoryl trihalide, the amount of "heel" reserved is usually governed by the amount of phosphorus halide and sulfur to be reacted in the next run. It is usually desirable to reserve an amount of catalyst which is sufficient to catalyze the subsequent reaction. Of course, if desired, a lesser amount of "heel" can be reserved and additional $AlCl_3$ added to the next run.

EXAMPLE IV

In a suitable reaction vessel, 16 g. of sulfur and a 5 ml. "heel (prepared in a manner similar to the preparation given in Example III) was heated to 112° C. Phosphorus trichloride, 68.6 g., was added to the molten charge over a period of 10 minutes. Methyl aluminum sesquichloride was added over a period of 19 minutes (temperature 113–132° C.). The resultant reaction mass was cooled to 30° C. and 25 g. of NaCl then added. Distillation at 50 mm., maximum liquid temperature 160° C., yields 67.3 g. product which was over 99 percent pure $CH_3PSCl_2$ with about 0.2 weight percent $PSCl_3$ percent. The corrected yield was 84.6 percent.

Similar results are obtained if the "heeled" is used to catalyze the reaction of PSCl₃ and S at 120° C. or at 50° C.

Similar results are obtained if a chemically equivalent amount of trimethyl aluminum is substituted for the methyl aluminum sesquichloride.

EXAMPLE V

A mixture containing 56.2 weight percent $CH_3PSCl_2$ and 43.8 weight percent decane was prepared. A stoichiometric amount of $AlCl_3$ (21.2 parts) was added to the $CH_3PSCl_2 \cdot AlCl_3$ was formed. This complex is separated from the decane layer and used to catalyze the formation of $PSCl_3$ from phosphorus trichloride and sulfur as follows:

(a) A stoichiometric quantity of $PCl_3$ and S is reacted at 50° C. in the presence of 0.075 mole of catalytic complex per mole of $PCl_3$.

(b) A stoichiometric quantity of $PCl_3$ and S is reacted at 120° C. in the presence of 0.3 mole of complex per mole of $PCl_3$.

(c) $PCl_3$ and S, mole ratio 1.20:1, is reacted at 70° C. in the presence of 0.1 mole of $CH_3PSCl_2 \cdot AlCl_3$ per mole of $PCl_3$.

(d) $PCl_3$ and S, mole ratio 1.0:1.20 is reacted at 75° C. in the presence of 0.2 mole of catalytic complex per mole of $PCl_3$.

Various runs are summarized in this example. A catalytic complex is prepared by adding stoichiometric quantities of Reactant A and Reactant B. (These reactants are listed below.)

EXAMPLE VI

| | Reactant A | Reactant B | Resultant complex |
|---|---|---|---|
| 1 | n-C₃H₇PSCl₂ | AlCl₃ | n-C₃H₇PSCl₂·AlCl₃ |
| 2 | n-C₄H₉PSCl₂ | Same as above. | n-C₄H₉PSCl₂·AlCl₃ |
| 3 | iso-C₄H₉PSCl₂ | ....do........ | iso-C₄H₉PSCl₂·AlCl₃ |
| 4 | sec-C₄H₉PSCl₂ | ....do........ | sec-C₄H₉PSCl₂·AlCl₃ |
| 5 | neo-C₅H₁₁PSCl₂ | ....do........ | neo-C₅H₁₁PSCl₂·AlCl₃ |
| 6 | n-C₆H₁₃PSCl₂ | ....do........ | n-C₆H₁₃PSCl₂·AlCl₃ |
| 7 | iso-C₆H₁₃PSCl₂ | ....do........ | iso-C₆H₁₃PSCl₂·AlCl₃ |

To the vessels containing the resultant complexes is added sulfur and then $PCl_3$ such that the amounts of sulfur, $PCl_3$ and catalyst are the same as in Example V(a). Reaction takes place at 50° C. In each instance the complexes catalyze the formation of $PSCl_3$. Likewise, when the temperatures and relative amounts specified in V(b), V(c), and V(d) are used, the complexes listed above also function as catalysts for the formation of $PSCl_3$.

Moreover, when the procedure of Examples I and II are followed except that the homologous aluminum sesquihalides and trialkyl aluminums having the alkyl groups set forth in Reactant A are employed, the compounds listed as "Reactant A" above are produced.

As an example of this, n-$C_3H_7PSCl_2$ is prepared according to Example I by (i) formation of $PSCl_3$ from $PCl_3$, S and $AlCl_3$
(ii) reaction of the $PSCl_3$ thereby produced with

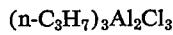
(n-$C_3H_7$)₃Al₂Cl₃ to form the mixture of n-$C_3H_7PSCl_2$ with its complex with $AlCl_3$.

(iii) reservation of a heel (that is a portion of this mixture) for catalysis of a subsequent reaction of $PCl_3$ and S to form $PSCl_3$
(iv) treatment of the remainder of the mixture with NaCl, KCl or dioxane to disrupt the complex.
(v) recovery of the $C_3H_7PSCl_2$ by distillation, and
(vi) repetition of Steps (i) to (v) except that the heel is used as the catalyst in Step (i) instead of $AlCl_3$.

The other compounds listed as Reactant (A) above are prepared in like manner.

EXAMPLE VII

Substantially stoichiometric quantities of $PBr_3$ and S are reacted at 60° C. using $CH_3PSBr_2 \cdot AlBr_3$ as a catalyst to form $PSBr_2$. On a mole basis, the amount of catalyst is 0.1 the amount of $PBr_3$. Similar results are obtained when reaction temperatures of 80° C., 100° C. and 120° C. are used. Similar results are obtained when the amount of catalyst is 0.075, 0.2, 0.3, 0.4, and 0.5 moles per mole of $PBr_3$.

EXAMPLE VIII

Substantially stoichiometric quantities of $PBr_3$ and S are reacted at 120° C. to form $PSBr_3$ by conducting the reaction in the presence of 0.1 mole of $C_2H_5PBr_2 \cdot AlBr_3$ per mole of $PBR_3$. The same catalytic effect is obtained when a similar amount of the following catalysts are substituted, one at a time, for the catalyst used above.

(1) $C_2H_5PBr_2 \cdot AlBr_3$
(2) n-$C_3H_7PBr_2 \cdot AlBr_3$
(3) n-$C_4H_9PBr_2 \cdot AlBr_3$
(4) n-$C_5H_{11}PBr_2 \cdot AlBr_3$
(5) iso-$C_5H_{11}PBr_2 \cdot AlBr_3$
(6) n-$C_6H_{13}PBr_2 \cdot AlBr_3$ Having fully described the process of this invention and its utility, it is desired that the invention should be limited solely by the lawful scope of the appended claims.

I claim:

1. A process for the preparation of a thiophosphoryl halide, said process comprising reacting sulfur and a phosphorus trihalide at a temperature of from about 50° to about 120° C., said process being catalyzed by a catalytic quantity of a catalytic complex having the formula $RPSX_2 \cdot AlX_3$ wherein R is an alkyl group having up to six carbon atoms, and X is a halogen of atomic number 17 to 35.

2. The process of claim 1 wherein said complex is $CH_3PCSl_2 \cdot AlCl_3$.

3. The process of claim 2 wherein said temperature is within the range of from about 60° to about 80° C.

4. The process of claim 3 wherein said catalytic complex is within the reaction product produced by reacting $PSCl_3$ and an alkylating agent selected from trimethyl aluminum and methyl aluminum sesquichloride.

5. The process of claim 1 wherein said complex is $C_2H_5PSCl_2 \cdot AlCl_3$.

6. The process of claim 5 wherein said temperature is from about 60–80° C.

7. The process of claim 6 wherein said catalytic complex is within the reaction product produced by reacting $PSCl_3$ with an alkylating agent selected from triethyl aluminum and ethyl aluminum sesquichloride.

8. Process of claim 1 wherein said phosphorus trihalide is phosphorus trichloride.

9. Process of claim 1 wherein said phosphorus trihalide is phosphorus tribromide.

10. Process of claim 1 wherein R is propyl.

11. Process of claim 1 wherein R is butyl.

12. Process of claim 1 wherein R is hexyl.

13. Process of claim 1 wherein said phosphorus trihalide is phosphorus trichloride and said catalytic complex is $C_2H_5PSCl_2 \cdot AlCl_3$.

14. Process of claim 1 wherein said phosphorus trihalide is phosphorus trichloride and said catalytic complex is $CH_3PSCl_2 \cdot AlCl_3$.

15. Process of claim 1 wherein R is pentyl.

16. The process of claim 1 wherein said catalytic complex is within the reaction product produced by reacting $PSX_3$ and an alkylating agent selected from the class consisting of $R_3Al_2X_3$ and $AlR_3$, wherein R is an alkyl group having up to six carbon atoms and X is a halogen of atomic number 17 to 35.

(References on following page)

References Cited

UNITED STATES PATENTS 3,458,569    7/1969    Melton _____ 260—543

OTHER REFERENCES

Okhlobystin et al. Acadeny of Science, USSR (1958) pp. 977–979 (Eng. trans.).

Kararanov et al. Chemical Abstracts vol. 63 (1965) p. 4327.

CHARLES B. PARKER, Primary Examiner

E. J. GLEIMAN, Assistant Examiner

U.S. Cl. X.R.

260—543P